US009417382B2

(12) United States Patent
Pimpinella et al.

(10) Patent No.: US 9,417,382 B2
(45) Date of Patent: Aug. 16, 2016

(54) MULTIMODE OPTICAL FIBERS AND METHODS OF MANUFACTURE THEREOF

(71) Applicant: Panduit Corp., Tinley Park, IL (US)

(72) Inventors: Richard J. Pimpinella, Frankfort, IL (US); Jose M. Castro, Lombard, IL (US); Brett Lane, Hinsdale, IL (US); Bulent Kose, Burr Ridge, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 14/188,749

(22) Filed: Feb. 25, 2014

(65) Prior Publication Data

US 2014/0241685 A1 Aug. 28, 2014

Related U.S. Application Data

(60) Provisional application No. 61/769,441, filed on Feb. 26, 2013.

(51) Int. Cl.
*G02B 6/028* (2006.01)
*G02B 6/032* (2006.01)
*G02B 6/036* (2006.01)
*G02B 1/10* (2015.01)
*G02B 6/02* (2006.01)

(52) U.S. Cl.
CPC ........... *G02B 6/0281* (2013.01); *G02B 1/10* (2013.01); *G02B 6/0288* (2013.01); *G02B 6/02214* (2013.01); *G02B 6/02261* (2013.01)

(58) Field of Classification Search
CPC .. G02B 6/0288; G02B 6/0281; G02B 6/0283; G02B 6/028; G02B 6/02047; G02B 6/0285; G02B 6/0286
USPC .................................. 385/123, 124, 141, 142
See application file for complete search history.

(56) References Cited

U.S. PATENT DOCUMENTS

| | | | | |
|---|---|---|---|---|
| 7,315,677 B1* | 1/2008 | Li et al. | ............ | 385/123 |
| 8,794,038 B2* | 8/2014 | Matthuse et al. | ............ | 65/397 |
| 2005/0008312 A1* | 1/2005 | Jang et al. | ............ | 385/124 |
| 2006/0045450 A1* | 3/2006 | Bickham | ............ | G02B 6/02014 385/127 |
| 2010/0040336 A1* | 2/2010 | Chen et al. | ............ | 385/124 |
| 2011/0037183 A1* | 2/2011 | Tudury et al. | ............ | 264/1.28 |

FOREIGN PATENT DOCUMENTS

EP 1895337 A1 5/2008

OTHER PUBLICATIONS

Bahaa E. A. Saleh, Malvin Carl Teich ("Fundamentals of Photonics"), Fiber Optics, chapter 8.*

* cited by examiner

*Primary Examiner* — Kaveh C Kianni
*Assistant Examiner* — Hung Lam
(74) *Attorney, Agent, or Firm* — Christopher S. Clancy; James H. Williams; Yuri Astvatsaturov

(57) ABSTRACT

The present invention generally relates to the field of fiber optics, and more specifically to optical fibers, methods of manufacturing optical fibers, and methods of classifying optical fibers. In an embodiment, the present invention is a multimode optical fiber which comprises a core and clad material system where the refractive indices of the core and cladding are selected to minimize chromatic dispersion in the 850 nm wavelength window and the refractive index profile is optimized for minimum modal-chromatic dispersion in channels utilizing VCSEL transceivers. Multimode optical fibers according to this embodiment may have increased channel bandwidth.

24 Claims, 5 Drawing Sheets

MULTIMODE OPTICAL FIBERS AND METHODS OF MANUFACTURE THEREOF

CROSS-REFERENCE TO RELATED APPLICATIONS

This application claims the benefit of U.S. Provisional Patent Application No.: 61/769,441, filed on Feb. 26, 2013, which is incorporated herein by reference in its entirety.

FIELD OF INVENTION

The present invention generally relates to the field of fiber optics, and more specifically to optical fibers, methods of manufacturing optical fibers, and methods of classifying optical fibers.

BACKGROUND

Fiber optic networks generally include transceivers which generate and sense optical pulses, and a transmission medium which allows the optical pulses to travel between the transceivers. While a wide range of optical transmitters have been used, ones operating at the 850 nm (nanometer) and 1300 nm wavelength windows have become relatively popular. To allow a multimode optical fiber (MMF) to operate in both of these windows, manufacturers shift the bandwidth of MMF between two wavelength windows by changing the shape of the refractive index profile of an MMF fiber core. The parameter that generally describes the refractive index profile is the alpha parameter (α-parameter), and the refractive index profile is often referred to as the α-profile. Depending upon the shape of the refractive index profile, the usual result is a fiber with either high bandwidth at the 850 nm window with low bandwidth at the 1300 nm window, or low bandwidth at the 850 nm with high bandwidth at the 1300 nm window.

While it is possible to design a dual wavelength window fiber for high bandwidth within a certain window (e.g., high bandwidth at 850 nm and low bandwidth at 1300 nm), factors such as modal and chromatic dispersion can limit the performance of such a fiber. In systems utilizing Vertical Cavity Surface Emitting Laser (VCSEL) transceivers the bandwidth of the fiber may be increased by modifying the refractive index profile to compensate for modal and chromatic dispersions as described in U.S. Pat. No. 8,398,900 to Tudury et al., entitled "Self-Compensating Multi-Mode Fiber," filed on Aug. 17, 2010, and incorporated herein by reference in its entirety, and in U.S. Pat. No. 8,483,534 to Tudury et al., entitled "Modified Refractive Index Profile for Low-Dispersion Multi-Mode Fiber, filed on Aug. 19, 2010, and incorporated herein by reference in its entirety. However, further modifications to the fiber to improve its performance are desired.

SUMMARY

Accordingly, embodiments of the present invention are directed to multimode optical fibers optimized for operation within a single wavelength window and methods of manufacture thereof.

In one embodiment, the present invention is a multimode optical fiber having reduced material dispersion in the operating wavelength window of a communication system.

In another embodiment, the present invention is a multimode optical fiber that compensates for modal-chromatic dispersion and has a modal bandwidth greater than 2000 MHz·km.

In yet another embodiment, the present invention is a multimode optical fiber which comprises a core and clad material system where the refractive indices of the core and cladding are selected to minimize chromatic dispersion in the 850 nm wavelength window and the refractive index profile is optimized for minimum modal-chromatic dispersion in channels utilizing VCSEL transceivers. Multimode optical fibers according to this embodiment may have increased channel bandwidth.

In still yet another embodiment, the present invention is a multimode optical fiber having a laser bandwidth that compensates for modal and chromatic dispersion in VCSEL-based communication systems.

In still yet another embodiment, the present invention is a multimode optical fiber having a material dispersion of the core which contains a concentration of at least one element chosen to minimize the effect of material dispersion.

In still yet another embodiment, the present invention is a multimode optical fiber comprising a cladding having a refractive index $n_1$ and a core at least partially surrounded by the cladding. The core has a refractive index profile optimized to operate within a single wavelength operating window and the core further having a center, the center of the core having a refractive index $n_0$, wherein $$\frac{(n_0^2 - n_1^2)}{2n_0^2} \approx 0.01$$

and wherein the core comprises at least one dopant, the at least one dopant reducing a zero dispersion wavelength of the multimode optical fiber below 1295 nm.

In still yet another embodiment, the present invention is a multimode optical fiber comprising a cladding with a refractive index $n_1$ and a core at least partially surrounded by the cladding. The core has a center and an outer radius a, the core further has a refractive index profile defined by a range of refractive indices n(r) defined by a function of a radial distance r from the center of the core $$n(r) = n_0\left(1 - 2\Delta\left(\frac{r}{a}\right)^{\alpha_{mc}}\right)^{0.5}, \text{ For } r < a$$

where $n_0$ is a refractive index at the center of the core, $\alpha_{mc}$ is a parameter defining a shape of the refractive index profile, and $$\Delta = \frac{(n_0^2 - n_1^2)}{2n_0^2}.$$

The core comprises at least one dopant, the at least one dopant being present in an amount sufficient to optimize the multimode optical fiber for operation within a single wavelength operating window and reduce a zero dispersion wavelength of the multimode optical fiber below 1295 nm.

In still yet another embodiment, the present invention is a multimode optical fiber comprising a core having a refractive index profile, a center, and an outer radius a, and a cladding at least partially surrounding the core. The core comprises at least one dopant in concentrations sufficient to optimize the refractive index profile for operation within a single wavelength operating window and reduce a zero dispersion wavelength of the multimode optical fiber below 1295 nm.

In still yet another embodiment, the present invention is a multimode optical fiber comprising a cladding having a refractive index $n_1$ and a core at least partially surrounded by the cladding. The core has a center with a refractive index $n_0$ wherein $$\frac{(n_0^2 - n_1^2)}{2n_0^2} \approx 0.01,$$

and wherein the core comprises an amount of at least one dopant, the amount of the least one dopant being sufficient to reduce a zero dispersion wavelength of the multimode optical fiber below 1295 nm.

In still yet another embodiment, the present invention is a multimode optical fiber comprising a cladding having a refractive index $n_1$ and a core at least partially surrounded by the cladding. The core has a center with a refractive index $n_0$ wherein $$\frac{(n_0^2 - n_1^2)}{2n_0^2} \approx 0.01,$$

and wherein the core is optimized to operate in an 850 nm wavelength window, and wherein a magnitude of the chromatic dispersion within the 850 nm wavelength window is less than 89 ps/nm-km.

In still yet another embodiment, the present invention is a method for manufacturing a multimode optical fiber, the method comprising the steps of: producing a core having a center, the step of producing a core includes adding a concentration of at least one core dopant to the core; at least partially surrounding the core with a cladding, the cladding having a concentration of at least one cladding dopant added to the cladding; and at least partially surrounding the cladding with a jacket. The at least one core dopant and the concentration of the at least one core dopant are selected to produce a refractive index $n_0$ at the center of the core and to reduce a zero dispersion wavelength of the core below 1295 nm. The at least one cladding dopant and the concentration of the at least one cladding dopant are selected to produce a cladding with a refractive index $n_1$. And the at least one core dopant, the concentration of the at least one core dopant, the at least one cladding dopant, and the concentration of the at least one cladding dopant are selected such that $$\frac{(n_0^2 - n_1^2)}{2n_0^2} \approx 0.01.$$

In still yet another embodiment, the present invention is a method for manufacturing a multimode optical fiber operable within a single wavelength operating window, the method comprising the steps of: producing a core having a center, the step of producing a core includes adding a concentration of at least one core dopant to the core; at least partially surrounding the core with a cladding, the cladding having a concentration of at least one cladding dopant added to the cladding; and at least partially surrounding the cladding with a jacket. The at least one core dopant and the concentration of the at least one core dopant is selected to produce a refractive index $n_0$ at the center of the core, to reduce a magnitude of chromatic dispersion within an 850 nm wavelength window to less than 89 ps/nm-km. The at least one cladding dopant and the concentration of the at least one cladding dopant is selected to produce a cladding with a refractive index $n_1$. And the at least one core dopant, the concentration of the at least one core dopant, the at least one cladding dopant, and the concentration of the at least one cladding dopant are selected such that $$\frac{(n_0^2 - n_1^2)}{2n_0^2} \approx 0.01.$$

In still yet another embodiment, the present invention is a method for manufacturing a multimode optical fiber operable within a single wavelength operating window, the method comprising the steps of: producing a core having a center, the step of producing a core includes adding a concentration of at least one core dopant to the core; at least partially surrounding the core with a cladding, the cladding having a concentration of at least one cladding dopant added to the cladding; and at least partially surrounding the cladding with a jacket. The at least one core dopant and the concentration of the at least one core dopant is selected to produce a refractive index $n_0$ at the center of the core, to reduce a magnitude of chromatic dispersion within an 850 nm wavelength window to less than 89 ps/nm-km, and to reduce a zero dispersion wavelength of the core below 1295 nm. The at least one cladding dopant and the concentration of the at least one cladding dopant is selected to produce a cladding with a refractive index $n_1$. And the at least one core dopant, the concentration of the at least one core dopant, the at least one cladding dopant, and the concentration of the at least one cladding dopant are selected such that $$\frac{(n_0^2 - n_1^2)}{2n_0^2} \approx 0.01.$$

These and other features, aspects, and advantages of the present invention will become better understood with reference to the following drawings, description, and any claims that may follow.

DETAILED DESCRIPTION

Figure 1:
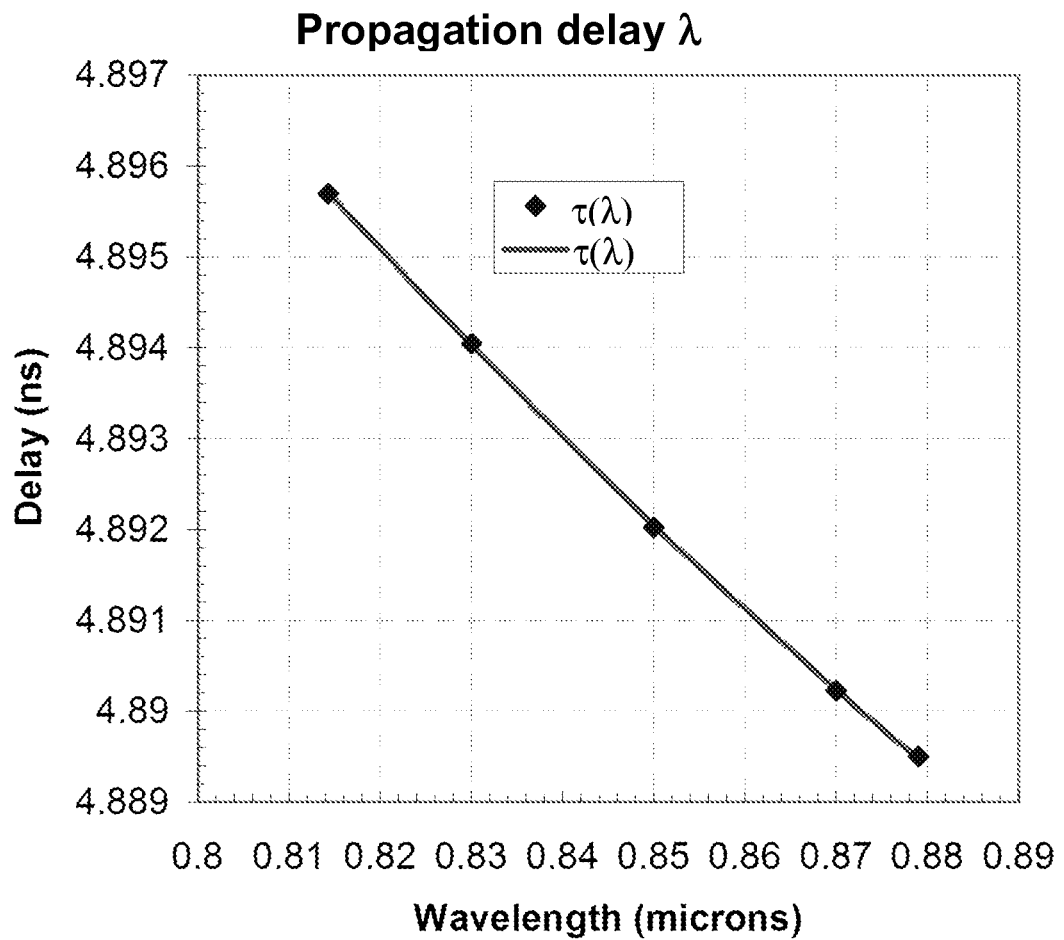
FIG. 1 illustrates measured wavelength delays for a typical multimode optical fiber.

As the bandwidth of network equipment increases, the need for legacy low-bandwidth LED transceivers operating in the 1300 nm wavelength window has diminished and therefore, the need for a dual window a-profile fiber may not be as prevalent. Since high-speed light sources for LANs (local area networks) are often designed to operate in the 850 nm window, it may be advantageous to optimize a fiber for the single 850 nm window. Focusing on optimizing a given fiber for a given wavelength window includes designing/implementing a refractive index profile which reduces chromatic dispersion and shifts the zero-dispersion wavelength to a lower wavelength. Accordingly, embodiments of the present invention are generally directed to multimode optical fibers adapted to operate within a single (e.g., 850 nm) wavelength window and methods of manufacture thereof.

To increase the bandwidth of a multimode optical fiber, it is desirable to equalize (or come close to equalizing) the mode delays for the modes being propagated by said fiber. In a multimode fiber supporting M number of modes, the output power of an impulse can be described as:

$$P_{out}(t) = \Sigma P_m \delta(\tau_m - \tau_{ave}) \tag{1}$$

where the $m^{th}$ mode has relative power $P_m$ and the mode delay $\tau_m$ relative to the average $\tau_{ave}$ is given by:

$$\tau_{ave} = \frac{\sum P_m \tau_m}{\sum P_m} \tag{2}$$

The laser bandwidth can be determined from the amplitude of the Fourier transform of the $P_{out}(t)$ and optical fiber is optimized if all $\tau_m$ are equal.

The mode delays $\tau_m$ are determined by the refractive index profile of an MMF and the wavelength of operation. The modal power $P_m$ depends on the characteristics of the source and the coupling. In an embodiment, a multimode fiber of the present invention is designed to meet the laser bandwidth of at least some of the lasers transceivers used in high-speed communication systems operating in the 850 nm window.

A fiber's refractive index profile generally relates to the index of refraction or impurity content of its core. Typically, MMFs are designed to have an index profile that varies as a function of radial position and is proportional to the impurity content (e.g., germanium). This index profile, n(r), is described by:

$$n(r) = n_0(1 - 2\Delta(r/\alpha)^\alpha)^{0.5}, \text{ For } r < \alpha \tag{3}$$

where, $n_0$ is the refractive index value at the center of the fiber core, r is the radial offset position, $\alpha$ is the radius of the core-clad interface, $\alpha$ is the profile shape parameter, and $\Delta$ is defined as:

$$\Delta = \frac{(n_0^2 - n_1^2)}{2n_0^2} \tag{4}$$

where $n_1$ is the index value at the core-clad interface.

For multimode fibers optimized for operation within two wavelength windows, the profile shape parameter $\alpha(r)$ changes continuously with radius so that the bandwidth objectives for both wavelengths are met. In such a case, equation (3) is given by:

$$n(r) = n_0(1 - 2\Delta(r/\alpha)^{\alpha(r)})^{0.5}, \text{ For } r < \alpha \tag{5}$$

In traditional MMFs designed for operation in two wavelength windows, the index parameter $\alpha(r)$ varies in an effort to equalize the model delays in regions of the core where the two wavelength sources concentrate their power. However, since a fiber optimized to operate within a single wavelength window would concentrate its source's power in a different region that a traditional MMF, such a fiber's $\alpha$-profile would be different from the $\alpha$-profile of a traditional MMF. In the present invention the multimode fiber is configured with an $\alpha$-parameter that optimizes the bandwidth performance in a single wavelength operating window (e.g., 850 nm).

Another important factor that affects the bandwidth of a multimode optical fiber is the inherent change in refractive index as a function of wavelength, which causes different wavelengths to travel at different speeds through the fiber. This phenomenon is known as material dispersion where:

$$\frac{d^2 n}{d^2 \lambda} \neq 0 \tag{6}$$

In optical fibers the combination of material dispersion and waveguide dispersion is called chromatic dispersion. However, in multimode fiber the effect of waveguide dispersion is negligible, and therefore material and chromatic dispersions may be considered to be the same and may be used interchangeably. It is possible to compute the chromatic dispersion of a fiber by numerically fitting pulse delay data as a function of wavelength using the following least-mean-square-error criterion:

$$\tau(\lambda) = A + B\lambda^2 + C\lambda^{-2} \tag{7}$$

where, $\tau(\lambda)$ is the spectral group delay as a function of wavelength and A, B, & C are fitted parameters. FIG. 1 shows the pulse delay as a function of wavelength for a typical multimode optical fiber.

The chromatic dispersion $D(\lambda)$ is defined as:

$$D(\lambda) \equiv \frac{d\tau}{d\lambda} \tag{8}$$

Combining equation (7) and equation (8) results in:

$$D(\lambda) = \frac{d}{d\lambda}\tau(\lambda) = 2(B\lambda - C\lambda^{-3}) \tag{9}$$

Using certain fitted parameters B & C it is possible to compute the wavelength for which the chromatic dispersion is zero. This is called the "zero-dispersion" wavelength, $\lambda_0$. Solving equation (9) to obtain the zero-dispersion wavelength results in:

$$\lambda_0 = \left(\frac{C}{B}\right)^{1/4} \tag{10}$$

Typical multimode fibers have a zero dispersion wavelength in the range $$1295 \text{ nm} \leq \lambda_0 \leq 1320 \text{ nm} \tag{11}$$

From equation (10) it is possible to solve for the parameter C in terms of $\lambda_0$:

$$C = B\lambda_0^4 \tag{12}$$

Another parameter important for describing a fiber's dispersion is the dispersion slope, $S(\lambda)$, which is the first derivative of the dispersion with respect to wavelength:

$$S(\lambda) = \frac{d}{d\lambda}D(\lambda) = \frac{d}{d\lambda}[2(B\lambda - C\lambda^{-3})] = 2B + 6C\lambda^{-4} \quad (13)$$

It is also possible to compute the dispersion slope for the zero-dispersion wavelength; this is called the zero-dispersion slope, $S_0$:

$$S_0 = S(\lambda_0) = 8B \text{ And, } B = \frac{S_0}{8} \quad (14)$$

It is then possible to rewrite $D(\lambda)$ in terms of $\lambda_0$ and $S_0$, yielding the final result for computing the chromatic dispersion, $$D(\lambda) = \frac{S_0}{4}\lambda\left(1 - \frac{\lambda_0^4}{\lambda^4}\right) \quad (15)$$

Figure 2A:
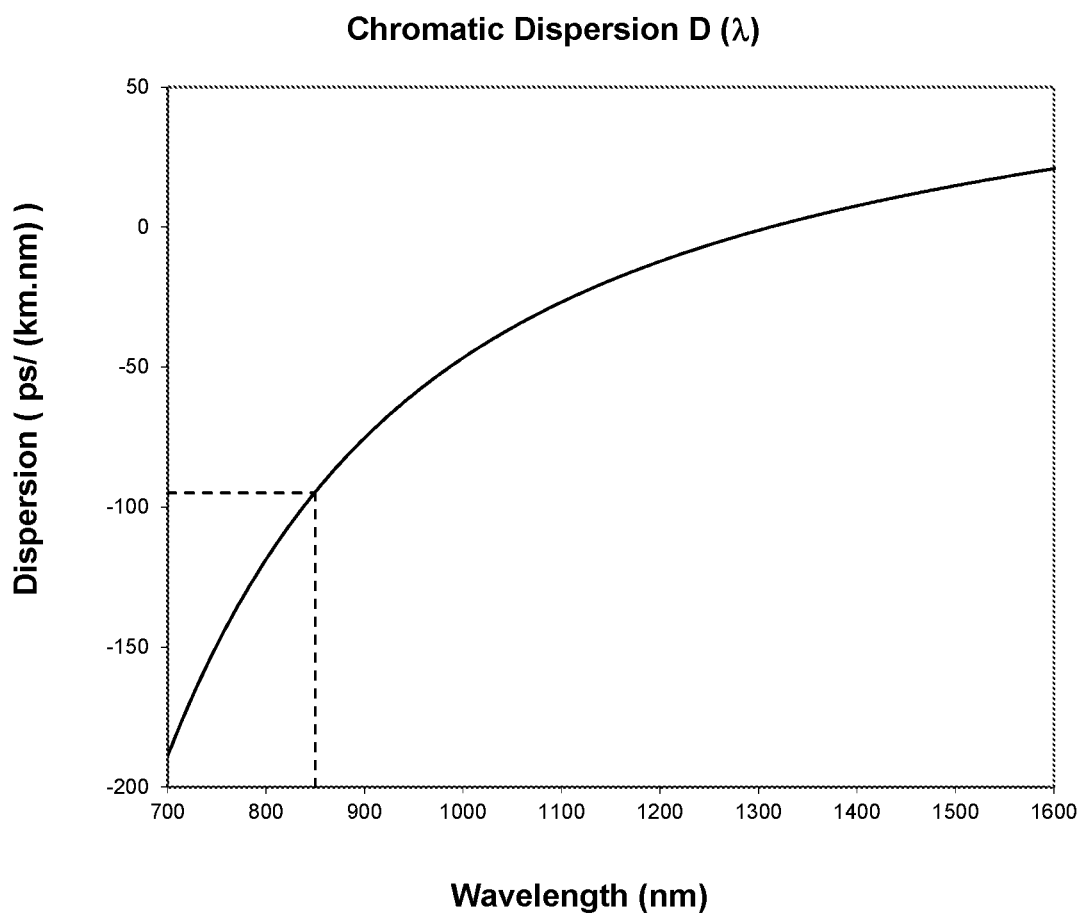
FIG. 2A illustrates wavelength dependence of chromatic dispersion in a typical multimode fiber.
Figure 2B:
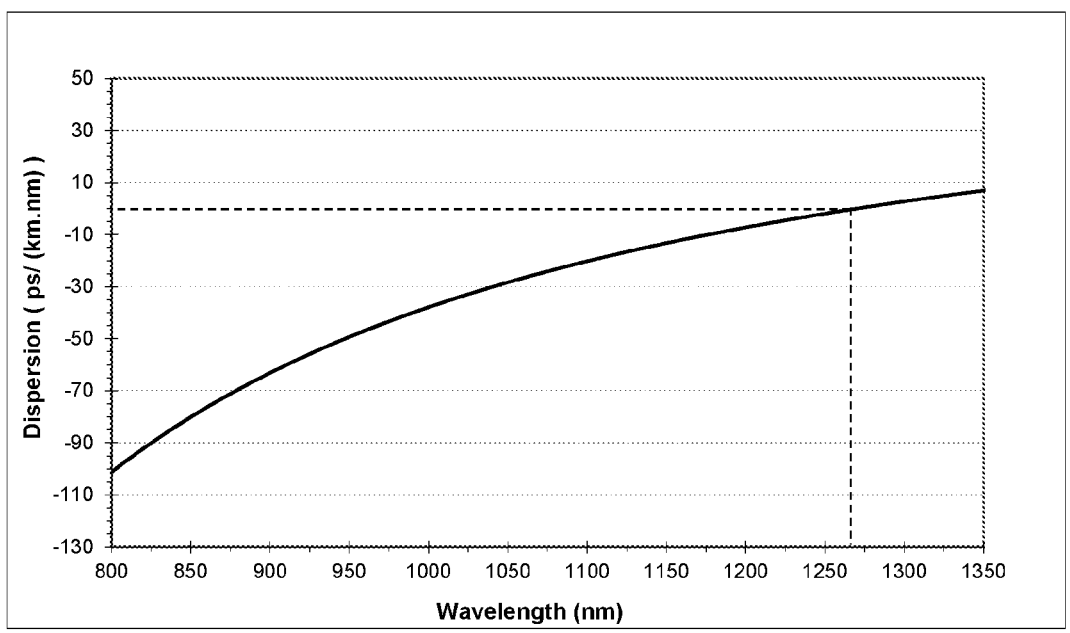
FIG. 2B illustrates wavelength dependence of chromatic dispersion in a multimode fiber according to an embodiment of the present invention.

As an example, using the data shown in FIG. 1, it is possible to find that $S_0$=0.0945 ps/nm, and $\lambda_0$=1312 nm. FIG. 2A shows the chromatic dispersion as a function of wavelength for this multimode fiber. For a 1312 nm wavelength, the chromatic dispersion is zero. However, in the short-wavelength window such as 850 nm, the chromatic dispersion is −98 ps/km·nm. For communication systems employing high modal bandwidth fibers (e.g., EMB>4700 MHz-km), the chromatic dispersion penalty of this fiber is large and can often dominate other bandwidth limiting factors. Using the same value of $S_0$=0.0945 ps/nm, FIG 2B shows the chromatic dispersion as a function of wavelength for a $\lambda_0$<1295 nm.

In a conventional α-profile multimode optical fiber the core region is typically doped with germanium, and due to the large material dispersion caused by germanium in a wavelength region far from the zero dispersion wavelength (e.g., the 850 nm window) the transmission bandwidth can be significantly reduced. In the present invention the core of the multimode optical fiber contains impurity content, herein referred to as a substance or dopant, which generally reduces the material dispersion in the 850 nm wavelength window, thereby allowing an MMF to operate at higher bandwidths. In an embodiment, an MMF of the present invention excludes germanium as a dopant.

In an embodiment, a fiber of the present invention is backward compatible with legacy fiber types. This imposes additional constraints on the refractive index of the core and cladding. For backward compatibility, the refractive indices of the core and cladding must be selected such that the numerical aperture (NA) and core diameter (CD) remain largely unchanged from values established by the industry standards to reduce interconnection loss and increase mode coupling. These conditions require that the difference in core-cladding refractive indices defined in equation (4) is approximately 1%, i.e.:

$$\Delta \approx 0.01 \pm \epsilon \quad (16)$$

where, $\epsilon$ represents the variation due to manufacturing process control.

A suitable material system for a fiber in accordance with the present invention can be identified by first computing the material dispersions for a set of potential substances, and then selecting the substance that provides the lowest material dispersion at the operating wavelength. In an embodiment, the substances are selected such that the fiber provides a reduced amount of chromatic dispersion at an operating wavelength window of 850 nm. In another embodiment, the magnitude of chromatic dispersion is reduced to less than 89 ps/nm-km within an operating wavelength window of 850 nm. Next, a suitable cladding substance is selected by imposing the requirement that the refractive index of the cladding must satisfy the condition specified by equation (16).

To compute the material dispersion of a potential substance, one must determine the refractive index of the substance as a function of wavelength. This can be done using the Sellmeier equation, which is an empirical relationship between refractive index and wavelength for a transparent medium. The Sellmeier equation can be written as:

$$n^2 = 1 + \sum_{i=1}^{3} \frac{a_i \lambda^2}{\lambda^2 - b_i^2} \quad (17)$$

where, $a_i$ and $b_i$ are the Sellmeier coefficients. This equation can be used to determine the dispersion of light for a specific substance under consideration. A substance compatible with the fiber manufacturing process can be fabricated by doping silica with various concentrations of elements. For each element and concentration, a set of Sellmeier coefficients can be determined. As an example, Table 1 lists the Sellmeier coefficients for four substances and two manufacturing technologies.

TABLE 1

Sellmeier coefficients for 4 doping element concentrations

| Sample | Preparing technologoy | Doping element & concentration | Sellmeier coefficients $a_i$ | Sellmeier coefficients $b_i$ |
|---|---|---|---|---|
| 1 | MCVD (Modified Chemical Vapor Deposition) | Cl (~0.06 wt %) | 0.50716$_1$ 0.59707$_2$ 0.69879$_3$ | 0.04014$_1$ 0.11359$_2$ 8.81674$_3$ |
| 2 | PCVD (Plasma Chemical Vapor Deposition) | CL (0.3 wt %) | 0.88671$_1$ 0.21675$_2$ 0.69401$_3$ | 0.07954$_1$ 0.12440$_2$ 8.83315$_3$ |
| 3 | PCVD | F (0.9 wt %) Cl (0.13 wt %) | 0.87219$_1$ 0.21238$_2$ 0.94959$_3$ | 0.07417$_1$ 0.12980$_2$ 10.22611$_3$ |
| 4 | MCVD | P (12.5 wt %) Cl (~0.03 wt %) | 0.51512$_1$ 0.62804$_2$ 1.07430$_3$ | 0.02636$_1$ 0.11614$_2$ 10.6931$_3$ |

Figure 3:
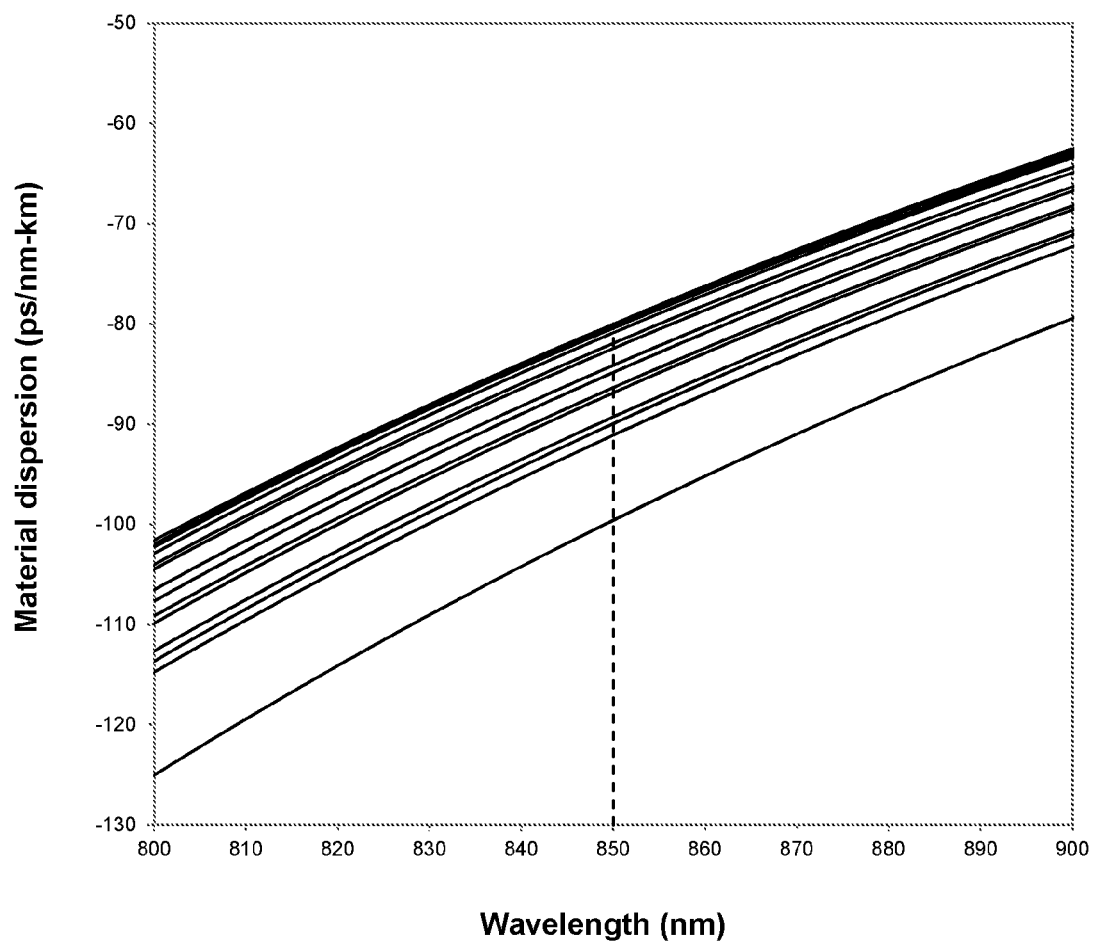
FIG. 3 illustrates wavelength dependence of material dispersion for sixteen different examples of core/cladding material systems.

Given that the refractive index can be approximated by the Sellmeier equation, the material dispersion can be calculated by taking the derivatives with respect to the spectral interval. Hence, the material dispersion is described by:

$$D = \frac{\lambda}{c}\frac{d^2 n_0}{d\lambda^2} \quad (18)$$

where, c is the speed of light and $n_0$ is the refractive index at the core center r=0, in an α-profile multimode fiber. Using the above described process, the material dispersion for sixteen different doped silica substances in various concentrations are shown in FIG. 3.

Analysis of the data shows that the material dispersion for the sixteen example material systems varies from −105 ps/nm·km to −80 ps/nm·km in the 850 nm window providing a potential 25% reduction in the magnitude of the material dispersion. It is important to note however, that not all of the material systems shown in FIG. 3 may be compatible with every manufacturing process. In an embodiment of the present invention the multimode optical fiber contains a silica core and a silica cladding where the dopants are selected to minimize material dispersion, maintain backward compatibility, and is compatible with at least one existing manufacturing process.

Using the selection criteria outlined in the above method, one can obtain candidate substances for the fiber core/cladding material system that provides sufficiently low chromatic dispersion and also meets the condition specified in equation (16). An example of a potential material system is a fiber core comprising at least one of $B_2O_3$ (boron trioxide) and $P_2O_5$ (phosphorus pentoxide), and a cladding doped with F (fluorine). In an embodiment, exemplary concentrations of this material system can be: $B_2O_3$ less than 15 mole %; $P_2O_5$ less than 10 mole %; and F less than 8 mole %.

Once the material system is selected, it is possible to calculate the optimum α-parameter for a multimode fiber. One method for calculating the α-parameter is to consider the difference in the group delay between the highest and lowest order modes ($v=v_h$ and $v=0$) described by:

$$\Delta t_g = t_g(v = v_h) - t_g(v = 0) \quad (19)$$
$$= \frac{N_0}{c}\left[\Delta\left(\frac{\alpha - 2 - y}{\alpha + 2}\right) + \frac{\Delta^2}{2}\left(\frac{3\alpha - 2 - 2y}{\alpha + 2}\right)\right]$$

where $N_0$ is the group index of the core material at r=0, and y is the profile dispersion parameter, given by:

$$y = -\frac{2n_0}{N_g}\frac{\lambda d\Delta}{\Delta d\lambda} \quad (20)$$

where $n_0$ is the refractive index at r=0, and $N_g$ is the group index given by:

$$N_g = n - \lambda \frac{dn}{d\lambda} \quad (21)$$

Since Δ is very small (~0.01), it is permissible to neglect the $\Delta^2$ term in equation (19). The first term is therefore reduced to zero when α achieves the optimum value:

$$\alpha_{opt} = 2 + y \quad (22)$$

This result describes the relationship between the optimum profile shape and the material dispersion, represented by y. With no material dispersion, equation (22) indicates that the simple parabolic profile (α=2) will optimize fiber performance. Using equation (22) in equation (19) and again neglecting the $\Delta^2$ term, it is found that $$\Delta t_g = \frac{N_0 \Delta}{c}\left(\frac{\alpha - \alpha_{opt}}{\alpha + 2}\right) \quad (23)$$

This states that with $\alpha > \alpha_{opt}$, the higher order modes will arrive at the output later than the fundamental mode; the reverse is true when $\alpha < \alpha_{opt}$.

Thus, it is desirable to have the refractive index profile of a multimode fiber designed for a particular wavelength. Deviation from this wavelength can result in increased differences between group delays for the modes. In an embodiment of the present invention, the α-parameter for the refractive index is selected for a single wavelength window (e.g., 850 nm+/−20 nm). Furthermore, in order to accommodate the spatial spectral bias of VCSEL based transceivers shown previously and compensate for modal and chromatic dispersion, in an embodiment the present invention imposes the requirement such that $\alpha < \alpha_{opt}$. Such an α-parameter may be referred to as $\alpha_{mc}$.

Accordingly, a fiber in accordance with an embodiment of the present invention has an $\alpha_{mc}$, less than $\alpha_{opt}$ by an amount δα expressed as:

$$\alpha_{mc} = \alpha_{opt} - \delta\alpha \quad (24)$$

MMF's which have zero dispersion wavelengths near 1300 nm have alpha values in the range of 2±0.1. The dopants required to reduce the zero dispersion wavelength also reduce the $\alpha_{opt}$ at 850 nm. Using the Sellmeier coefficients for currently known dopants, simulations indicate values for $\alpha_{opt}$ and δα in the range:

$$1.65 < \alpha_{opt} < 1.85 \quad (25)$$

$$0.005 < \delta\alpha < 0.025 \quad (26)$$

Figure 4:
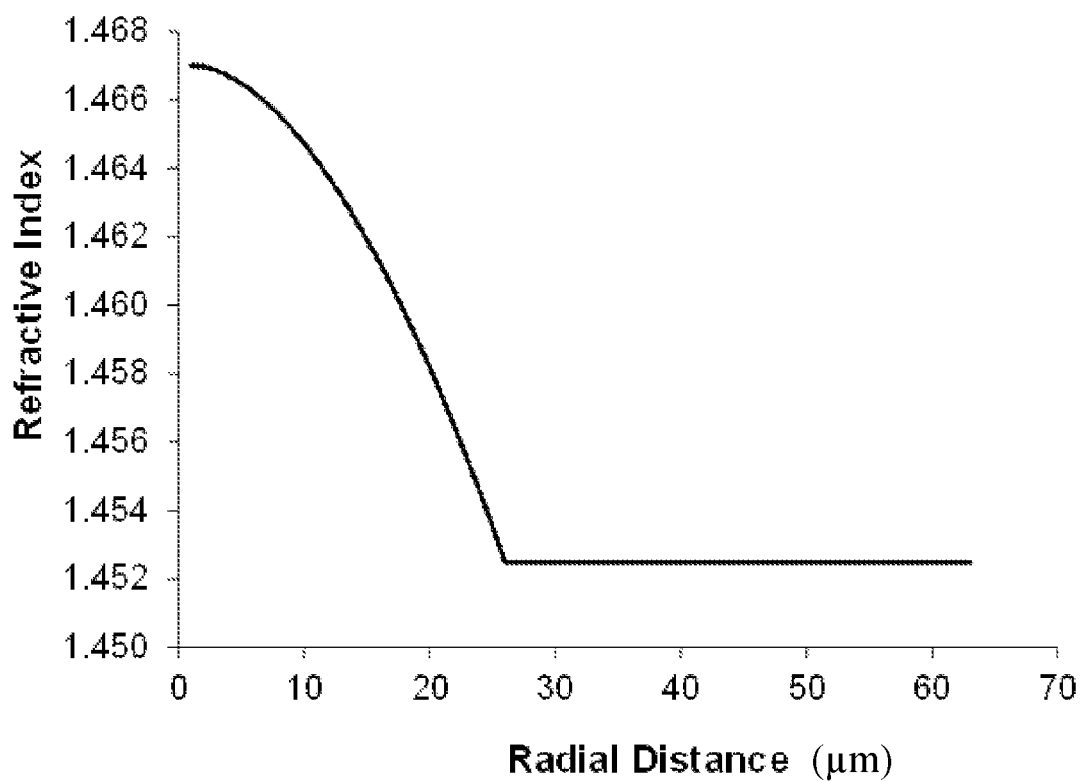
FIG. 4 illustrates a refractive index of a multimode optical fiber according to an embodiment of the present invention.

A non-limiting example of a refractive index of a fiber core having an α-parameter according to an embodiment of the present invention is shown in FIG. 4. In this figure, it is assumed that the fiber core has a radius of about 25 microns and is covered with a cladding having a relatively constant refractive index.

Future dopant materials might not be restricted by the condition specified by equation (25), however, in order to enable the proposed benefits the requirements described by equation (24) must be satisfied.

Although an embodiment of the present invention requires an $\alpha_{mc}$ less than $\alpha_{opt}$ to compensate modal and chromatic dispersions in VCSEL communication systems, in the absence of any variation in mode group spectra, this invention provides the benefit of reduced chromatic dispersion for the primary operating wavelength. The lower chromatic dispersion also enables the use of lasers with broader spectral widths. Finally, if the fiber is not required to be backward compatible with legacy fibers, it may be possible to design a fiber with still higher bandwidth.

Note that while this invention has been described in terms of several embodiments, these embodiments are non-limiting (regardless of whether they have been labeled as exemplary or not), and there are alterations, permutations, and equivalents, which fall within the scope of this invention. Furthermore, the described embodiments should not be interpreted as mutually exclusive, and should instead be understood as potentially combinable if such combinations are permissive. It should also be noted that there are many alternative ways of implementing the methods and apparatuses of the present invention. It is therefore intended that claims that may follow be interpreted as including all such alterations, permutations, and equivalents as fall within the true spirit and scope of the present invention.

We claim:

1. A multimode optical fiber comprising:
a cladding having a refractive index $n_1$; and
a core at least partially surrounded by said cladding,
said core having a refractive index profile optimized to operate within a single wavelength operating window, said core further having a center, said center of said core having a refractive index $n_0$, wherein $$\frac{(n_0^2 - n_1^2)}{2n_0^2} \approx 0.01,$$

and wherein said core comprises at least one dopant, said at least one dopant reducing a zero dispersion wavelength of said multimode optical fiber below 1295 nanometers (nm), wherein said single wavelength operating window is an 850 nm wavelength window, and wherein said multimode optical fiber does not support operation outside of said single wavelength operating window.

2. The multimode optical fiber of claim 1, wherein said at least one dopant reduces a magnitude of chromatic dispersion within said 850 nm wavelength window to less than 89 picoseconds per nanometer wavelength change and kilometer propagation distance (ps/nm-km).

3. The multimode optical fiber of claim 1, wherein said at least one dopant comprises at least one of boron trioxide and phosphorus pentoxide.

4. The multimode optical fiber of claim 3, wherein a concentration of said boron trioxide is less than 15 mole %; and wherein a concentration of said phosphorus pentoxide is less than 10 mole %.

5. The multimode optical fiber of claim 3, wherein said cladding comprises fluorine.

6. The multimode optical fiber of claim 5, wherein a concentration of said fluorine is less than 8 mole %.

7. The multimode optical fiber of claim 1, wherein said refractive index profile is defined by a range of refractive indices n(r) defined by a function of a radial distance r from said center of said core:

$$n(r) = n_0 \left(1 - 2\Delta \left(\frac{r}{a}\right)^{\alpha_{mc}}\right)^{0.5}, \text{For } r < a$$

where:

a is an outer radius of said core, $\alpha_{mc}$ is a parameter defining a shape of said refractive index profile; and $$\Delta = \frac{(n_0^2 - n_1^2)}{2n_0^2},$$

wherein said $\alpha_{mc}$ is selected to compensate for modal dispersion and for chromatic dispersion within said single wavelength operating window.

8. The multimode optical fiber of claim 7, wherein said $\alpha_{mc}$ comprises $\alpha_{opt}$ and $\delta\alpha$ such that:

$$\alpha_{mc} = \alpha_{opt} - \delta\alpha,$$

wherein said $\alpha_{opt}$ compensates for said modal dispersion with said single wavelength operating window and said $\delta\alpha$ compensates for said chromatic dispersion with said single wavelength operating window, and wherein said $\alpha_{opt}$ is greater than 1.65 and less than 1.85, and said $\delta\alpha$ is greater than 0.005 and less than 0.025.

9. A multimode optical fiber comprising:

a cladding with a refractive index $n_1$; and a core at least partially surrounded by said cladding, said core having a center and an outer radius a, said core further having a refractive index profile defined by a range of refractive indices n(r) defined by a function of a radial distance r from said center of said core:

$$n(r) = n_0 \left(1 - 2\Delta \left(\frac{r}{a}\right)^{\alpha_{mc}}\right)^{0.5}, \text{For } r < a$$

where:

$n_0$ is a refractive index at said center of said core;

$\alpha_{mc}$ is a parameter defining a shape of said refractive index profile; and $$\Delta = \frac{(n_0^2 - n_1^2)}{2n_0^2},$$

wherein said core comprises at least one dopant, said at least one dopant being present in an amount sufficient to optimize said multimode optical fiber for operation within a single wavelength operating window and reduce a zero dispersion wavelength of said multimode optical fiber below 1295 nanometers (nm), wherein said single wavelength operating window is an 850 nm wavelength window, and wherein said multimode optical fiber does not support operation outside of said single wavelength operating window.

10. The multimode optical fiber of claim 9, wherein said $\alpha_{mc}$ is selected to compensate for modal dispersion and for chromatic dispersion within said single wavelength operating window.

11. The multimode optical fiber of claim 10, wherein said $\alpha_{mc}$ comprises $\alpha_{opt}$ and $\delta\alpha$ such that:

$$\alpha_{mc} = \alpha_{opt} - \delta\alpha,$$

wherein said $\alpha_{opt}$ compensates for said modal dispersion with said single wavelength operating window and said $\delta\alpha$ compensates for said chromatic dispersion with said single wavelength operating window, and wherein said $\alpha_{opt}$ is greater than 1.65 and less than 1.85, and said $\delta\alpha$ is greater than 0.005 and less than 0.025.

12. A multimode optical fiber comprising:

a core having a refractive index profile, said core further having a center and an outer radius a; and a cladding at least partially surrounding said core, wherein said core comprises at least one dopant in concentrations sufficient to optimize said refractive index profile for operation within a single wavelength operating window and reduce a zero dispersion wavelength of said multimode optical fiber below 1295 nanometers (nm), wherein said single wavelength operating window is an 850 nm wavelength window, and wherein said multimode optical fiber does not support operation outside of said single wavelength operating window.

13. The multimode optical fiber of claim 12, wherein said at least one dopant reduces a magnitude of chromatic dispersion within said 850 nm wavelength window to less than 89 picoseconds per nanometer wavelength change and kilometer propagation distance (ps/nm-km).

14. The multimode optical fiber of claim 12, wherein said refractive index profile compensates for modal dispersion and for chromatic dispersion within said single wavelength operating window.

15. The multimode optical fiber of claim 14, wherein said refractive index profile is defined by an α-profile, said α-profile being defined by:

$$\alpha_{mc} = \alpha_{opt} - \delta\alpha,$$

wherein said $\alpha_{opt}$ compensates for said modal dispersion with said single wavelength operating window and said $\delta\alpha$ compensates for said chromatic dispersion with said single wavelength operating window, and wherein said $\alpha_{opt}$ is greater than 1.65 and less than 1.85, and said $\delta\alpha$ is greater than 0.005 and less than 0.025.

16. The multimode optical fiber of claim 12, wherein said at least one dopant comprises at least one of boron, oxygen, chlorine, phosphorus, and fluorine.

17. The multimode optical fiber of claim 12, wherein said at least one dopant excludes germanium.

18. A multimode optical fiber comprising;
a cladding having a refractive index $n_1$; and
a core at least partially surrounded by said cladding, said core having a center with a refractive index $n_0$, wherein $$\frac{(n_0^2 - n_1^2)}{2n_0^2} \approx 0.01,$$

and
wherein said core is optimized to operate in a single 850 nm wavelength window, wherein a magnitude of said chromatic dispersion within said 850 nm wavelength window is less than 89 picoseconds per nanometer wavelength change and kilometer propagation distance (ps/nm-km), and wherein said multimode optical fiber does not support operation outside of said single wavelength operating window.

19. The multimode optical fiber of claim 18, wherein a zero dispersion wavelength of said multimode optical fiber below 1295 nanometers (nm).

20. A method for manufacturing a multimode optical fiber that supports operation only within a single wavelength operating window, said method comprising the steps of:
producing a core having a center and a refractive index profile optimized to operate within said single wavelength operating window, said single wavelength operating window being an 850 nm wavelength window, said step of producing a core includes adding a concentration of at least one core dopant to said core;
at least partially surrounding said core with a cladding, said cladding having a concentration of at least one cladding dopant added to said cladding; and
at least partially surrounding said cladding with a jacket,
wherein said at least one core dopant and said concentration of said at least one core dopant are selected to produce a refractive index $n_0$ at said center of said core and to reduce a zero dispersion wavelength of said core below 1295 nanometers (nm),
wherein said at least one cladding dopant and said concentration of said at least one cladding dopant are selected to produce a cladding with a refractive index $n_1$, and
wherein said at least one core dopant, said concentration of said at least one core dopant, said at least one cladding dopant, and said concentration of said at least one cladding dopant are selected such that $$\frac{(n_0^2 - n_1^2)}{2n_0^2} \approx 0.01.$$

21. The method of claim 20, wherein said step of adding said concentration of said at least one core dopant to said core includes adding at least one of boron, oxygen, chlorine, phosphorus, and fluorine,
and wherein said at least one cladding dopant includes fluorine.

22. The method of claim 20, wherein said step of adding said concentration of said at least one core dopant to said core excludes adding germanium.

23. A method for manufacturing a multimode optical fiber operable only within a single wavelength operating window, said method comprising the steps of:
producing a core having a center and a refractive index profile optimized to operate within a single wavelength operating window, said single wavelength operating window being an 850 nm wavelength window, said step of producing a core includes adding a concentration of at least one core dopant to said core;
at least partially surrounding said core with a cladding, said cladding having a concentration of at least one cladding dopant added to said cladding; and
at least partially surrounding said cladding with a jacket,
wherein said at least one core dopant and said concentration of said at least one core dopant is selected to produce a refractive index $n_0$ at said center of said core and to reduce a magnitude of chromatic dispersion within an 850 nanometers (nm) wavelength window to less than 89 picoseconds per nanometer wavelength change and kilometer propagation distance (ps/nm-km),
wherein said at least one cladding dopant and said concentration of said at least one cladding dopant is selected to produce a cladding with a refractive index $n_1$, and
wherein said at least one core dopant, said concentration of said at least one core dopant, said at least one cladding dopant, and said concentration of said at least one cladding dopant are selected such that $$\frac{(n_0^2 - n_1^2)}{2n_0^2} \approx 0.01.$$

24. A method for manufacturing a multimode optical fiber operable only within a single wavelength operating window, said method comprising the steps of:
producing a core having a center and a refractive index profile optimized to operate within a single wavelength operating window, said single wavelength operating window being an 850 nm wavelength window, said step of producing a core includes adding a concentration of at least one core dopant to said core;
at least partially surrounding said core with a cladding, said cladding having a concentration of at least one cladding dopant added to said cladding; and
at least partially surrounding said cladding with a jacket,
wherein said at least one core dopant and said concentration of said at least one core dopant is selected to produce a refractive index $n_0$ at said center of said core, to reduce a magnitude of chromatic dispersion within an 850 nanometers (nm) wavelength window to less than 89 picoseconds per nanometer wavelength change and kilometer propagation distance (ps/nm-km), and to reduce a zero dispersion wavelength of said core below 1295 nanometers (nm), wherein said at least one cladding dopant and said concentration of said at least one cladding dopant is selected to produce a cladding with a refractive index $n_1$, and wherein said at least one core dopant, said concentration of said at least one core dopant, said at least one cladding dopant, and said concentration of said at least one cladding dopant are selected such that $$\frac{(n_0^2 - n_1^2)}{2n_0^2} \approx 0.01.$$

* * * * *